United States Patent

Garrett

[11] Patent Number: 6,073,540
[45] Date of Patent: Jun. 13, 2000

[54] APPARATUS FOR HEATING OR COOLING PRODUCT CONTAINERS

[75] Inventor: Robert A. Garrett, Jackson, Calif.

[73] Assignee: FMC Corporation, Stockton, Calif.

[21] Appl. No.: 09/188,950

[22] Filed: Nov. 10, 1998

[51] Int. Cl.⁷ .............................. A23L 1/00; A23L 3/00; A23L 3/04; A23L 3/18; A47J 27/122

[52] U.S. Cl. .............................. 99/330; 99/355; 99/360; 99/371; 99/404; 99/443 C; 99/470; 99/479; 99/483; 62/63; 62/374; 62/381

[58] Field of Search .............................. 99/330, 339, 340, 99/352–355, 359–371, 516, 404, 534, 536, 467, 468, 470, 477–479, 443 R, 443 C, 386, 483; 53/563, 379, 388, 576, 579; 34/216, 236; 62/63, 64, 374, 378, 380, 381; 165/120; 198/952, 752, 603; 426/405, 412, 510, 511, 520–523

[56] References Cited

U.S. PATENT DOCUMENTS

| | | |
|---|---|---|
| Re. 31,513 | 1/1984 | Glen ........................................ 426/521 |
| 1,570,235 | 1/1926 | Fooks . |
| 1,835,799 | 12/1931 | Meyer . |
| 1,948,790 | 2/1934 | Grayson ..................................... 62/104 |
| 1,961,337 | 6/1934 | Cornell ..................................... 62/104 |
| 2,254,420 | 9/1941 | Cleveland ................................. 62/102 |
| 2,274,292 | 2/1942 | Hiller, Jr. .................................. 62/104 |
| 2,454,704 | 11/1948 | McMichael ............................... 62/170 |
| 2,597,223 | 5/1952 | Burgess ..................................... 99/214 |
| 3,006,774 | 10/1961 | Zebarth ...................................... 99/192 |
| 3,052,559 | 9/1962 | Peebles ..................................... 99/214 |
| 3,132,688 | 5/1964 | Nowak ...................................... 165/25 |
| 3,205,543 | 9/1965 | Morris et al. ................................. 22/89 |
| 3,283,523 | 11/1966 | Long ............................................ 62/63 |
| 3,302,423 | 2/1967 | Morrison ................................... 62/266 |
| 3,389,568 | 6/1968 | Miller et al. .................................. 62/63 |
| 3,405,531 | 10/1968 | Davis, Jr. et al. ........................... 62/63 |
| 3,464,835 | 9/1969 | Castro ........................................ 99/212 |
| 3,481,688 | 12/1969 | Craig et al. .................................. 21/56 |
| 3,603,102 | 9/1971 | Banas .......................................... 62/64 |
| 3,613,551 | 10/1971 | Relmers ..................................... 99/360 |
| 3,732,917 | 5/1973 | Deubel ......................................... 165/1 |
| 3,875,754 | 4/1975 | Faust et al. .................................. 62/60 |
| 3,987,602 | 10/1976 | Stahl ........................................... 53/25 |
| 4,261,181 | 4/1981 | Hofstetter ................................. 62/208 |
| 4,384,463 | 5/1983 | Rica et al. ................................. 62/374 |
| 4,385,035 | 5/1983 | Akitoshi et al. .......................... 422/297 |
| 4,437,315 | 3/1984 | Rica et al. ................................... 62/63 |
| 4,505,670 | 3/1985 | Silvestrini et al. ....................... 432/124 |
| 4,614,079 | 9/1986 | Ida et al. .................................... 53/563 |
| 4,666,722 | 5/1987 | Creed et al. .............................. 426/393 |
| 4,713,252 | 12/1987 | Ismail ....................................... 426/290 |
| 4,748,816 | 6/1988 | Arfert et al. ................................. 62/63 |
| 4,875,344 | 10/1989 | Zittel ......................................... 62/381 |
| 4,921,719 | 5/1990 | Kohlbach ................................. 426/521 |
| 4,983,411 | 1/1991 | Tanaka et al. ........................... 426/234 |
| 5,009,150 | 4/1991 | Andersen ................................... 99/360 |
| 5,161,457 | 11/1992 | Evans ..................................... 99/443 C |
| 5,317,818 | 6/1994 | Ward ............................................. 34/7 |
| 5,370,174 | 12/1994 | Silvestrini et al. .......................... 165/2 |
| 5,423,414 | 6/1995 | Vaughn et al. ........................... 198/603 |
| 5,428,972 | 7/1995 | Germain ................................... 62/374 |
| 5,493,956 | 2/1996 | Larsen ................................... 99/360 X |
| 5,651,191 | 7/1997 | Walunas et al. .......................... 34/236 |
| 5,669,288 | 9/1997 | Zittel et al. ............................... 99/348 |
| 5,747,085 | 5/1998 | Veltman et al. ...................... 426/523 X |

OTHER PUBLICATIONS

I&H Engineered Systems Inc., *Atmospheric Spray Coolers,* Article, Jul. 1998.

Primary Examiner—Timothy Simone
Attorney, Agent, or Firm—Wood, Herron & Evans, L.L.P.

[57] ABSTRACT

Apparatus and methods for transferring heat between a heat transfer liquid and a plurality of moving containers of food product. The containers are conveyed by a perforated conveyor at least partially submerged in a pool of the heat transfer liquid and are showered at the same time with the heat transfer liquid. The pool of heat transfer liquid continuously drains and recirculates through either a heater or a chiller. A vibrator unit vibrates the pool of heat transfer liquid, the conveyor and the containers during the heat transfer operation.

27 Claims, 5 Drawing Sheets

APPARATUS FOR HEATING OR COOLING PRODUCT CONTAINERS

FIELD OF THE INVENTION

The present invention generally relates to heat exchange systems and, more specifically, to apparatus and methods for heating or cooling product containers, for example, filled with liquid-based food product.

BACKGROUND OF THE INVENTION

In many food processing operations, such as in the processing of fruit and vegetable products, the food product must be heated and maintained at a sterilizing temperature and then cooled sufficiently to allow further packaging and transport. After proper heat sterilization, the product is either cooled and then packaged under aseptic conditions, or the product is immediately packaged in a heated, sterile condition and then cooled to a temperature sufficient for additional packaging and shipping. The product may also be packed cold in a container, and then sealed, sterilized and cooled in the container. Cooling the sterilized food product while the product is sealed within a container, such as a flexible bag, eliminates the need for filling sterile bags with cooled, sterile food product under aseptic conditions. Instead, the bag may be filled with heated, sterilized food product and sealed to ensure that the food product remains sterile. To achieve acceptable cooling times, complex cooling equipment has generally been designed to accommodate specific package types. On the other hand, simpler conveying systems that merely spray the packages with chilled liquid result in longer cooling times and, therefore, higher processing costs.

Many different systems have been proposed and used for continuously heating and/or cooling containers of food product along a moving production line. As mentioned above, some of the more complex systems include mechanisms or structure for agitating the food contents as the containers are heated or cooled by liquid or gas heat transfer media. For example, cans of liquid-based food product have been agitated back and forth or rolled as a conveyor moves the cans past nozzles that spray the cans with a heat transfer liquid. With other equipment, pouches or bags have been manipulated by rollers or rocked back and forth on specialized carriers while the pouches are conveyed through a heat transfer media.

To address various problems of the past, it would be desirable to provide apparatus and methods for heating and/or cooling product quickly and uniformly, whether the product is packaged in a rigid or flexible container.

SUMMARY OF THE INVENTION

The present invention therefore generally provides apparatus for transferring heat between a heat transfer liquid and a plurality of flexible or rigid containers filled at least partially with food product. The apparatus may comprise essentially one module or a series of modules linked to form a longer system. The apparatus generally comprises a perforated conveyor having a conveying surface for supporting the containers and transferring the containers through a housing structure. A conveyor pan receives the perforated conveyor and includes an open top portion and at least one drain. The conveyor pan holds a continuously recirculating pool of heat transfer liquid at a level disposed above the conveying surface of the perforated conveyor. In this manner, heat is transferred between the pool of heat transfer liquid and the contents of the containers. In addition, a heat transfer liquid distributor is spaced above the perforated conveyor and showers the containers with heat transfer liquid directed through the open top portion of the conveyor pan. This effects further heat transfer between the showering liquid and the contents of the containers. Finally, a vibrator unit is operatively connected with the conveyor pan and vibrates the conveyor pan, the perforated conveyor, the pool of heat transfer liquid and the containers of food product as the containers are moved by the conveyor. Uniform, efficient heat transfer therefore occurs between the heat transfer liquid and the food product in the containers. The apparatus accomplishes this result while also being easily incorporated into existing processing operations and being versatile enough to accommodate a wide variety of container sizes and types.

In the preferred embodiment, a conveyor support contacts the perforated conveyor and is mounted along a bottom surface of the perforated conveyor pan to transmit vibrations between the vibrator unit and the perforated conveyor. A liquid return pan is mounted below the conveyor pan for receiving the heat transfer liquid from the drain. The liquid is drained in a continuous manner or, in other words, in a manner which maintains a predetermined liquid pool level that partially submerges the containers moving along the conveyor. The drain of the conveyor pan preferably comprises multiple perforations in a lower surface of the conveyor pan. These perforations generally occupy an area opposed to the conveying surface such that the pool of heat transfer liquid drains across the conveying surface in a generally uniform manner. The perforated conveyor is a continuous conveyor that has a lower portion passing through the liquid return pan. The perforated conveyor additionally includes a plurality of high friction elements on the conveying surface for maintaining the containers in contact with the perforated conveyor and moving through the pool of liquid. Other structure may be provided for this purpose in addition or as an alternative to the high friction elements.

The housing structure includes an inlet end and an outlet end and the perforated conveyor is more specifically a flexible belt having portions disposed generally at the inlet and outlet ends. Guide elements contact these portions of the belt and direct the belt downwardly into the conveyor pan. The liquid distributor is preferably a liquid distributing pan adapted to hold a volume of the heat transfer liquid. The liquid distributor pan includes a lower, perforated surface generally occupying an area opposed to and covering the conveying surface of the perforated conveyor. Therefore, the liquid distribution pan uniform ly showers the containers on the conveying surface with chilled or heated liquid. A heat exchanger receives the heat transfer liquid in a recirculation path generally between the conveyor pan and the liquid distributor pan to continuously heat or cool the liquid. Finally, a plurality of pneumatic vibration dampeners are mounted between the housing structure and the conveyor p an and, more preferably, between a conveyor pan support structure and the conveyor pan. These devices isolate vibrations of the conveyor pan from the remaining portions of the housing structure, and provide height adjustment to maintain the conveyor pan at optimum operational height.

The invention is also directed to methods for effecting heat transfer between a plurality of containers filled with food product and a heat transfer liquid. These methods may be performed using apparatus as generally described above, and involve moving the plurality of containers along a perforated conveyor which is positioned to partially submerge the containers within a pool of the heat transfer liquid.

Heat transfer liquid showers the containers as they move along the perforated conveyor. The pool of heat transfer liquid is drained to maintain a level that partially submerges the containers. Finally, the perforated conveyor, the pool of heat transfer liquid, and the containers are vibrated during the conveying and showering operation to agitate the product within the container and effect more uniform heat transfer.

Various additional objects, advantages and features of the invention will become more readily apparent to those of ordinary skill in the art upon review of the following detailed description of the preferred embodiment taken in conjunction with the accompanying drawings.

DETAILED DESCRIPTION OF THE PREFERRED EMBODIMENT

Figure 1:
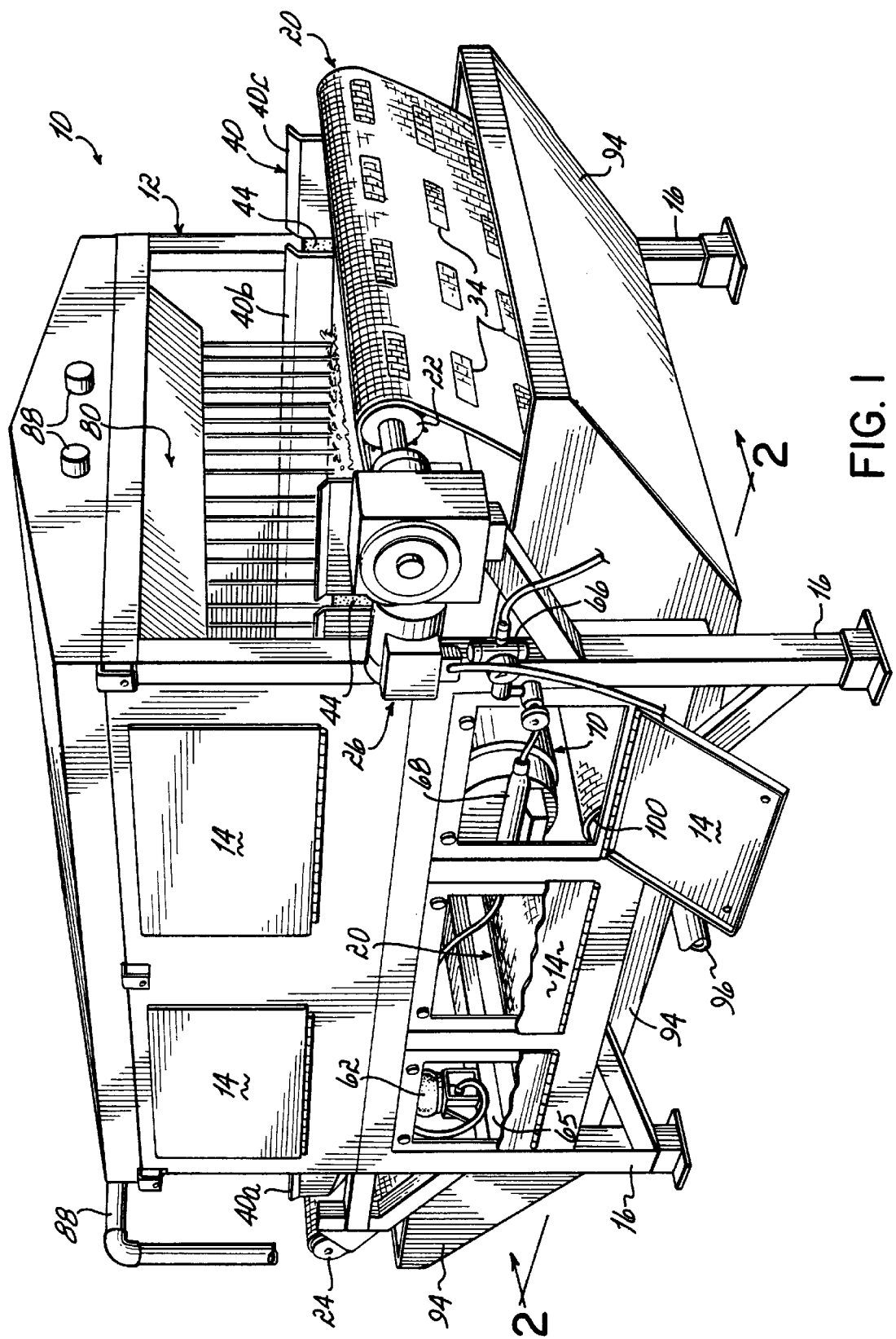
FIG. 1 is a perspective view of an apparatus constructed in accordance with the preferred embodiment.

Referring first to FIGS. 1–4, an apparatus 10 constructed in accordance with the preferred embodiment includes a housing structure 12. It will be appreciated that apparatus 10 may take on many different forms in accordance with this invention, however, one useful form is that of a module which is useful alone or linked with like modules to form a longer heat transfer path, as will be appreciated from the description to follow. Housing structure 12 may include a plurality of access panels 14 and may generally include various types of frame structure 16 for support purposes.

Apparatus 10 more specifically includes a perforated conveyor belt 20, which may be formed from any suitable perforated material or structure allowing a heat transfer liquid to flow through the conveyor. One suitable conveyor belt is sold under No. IS62051S-HA-HF, obtainable from KVP/Falcon, located in Rancho Cordova, Calif. Perforated conveyor belt 20 is preferably a continuous conveyor belt which moves from left to right, as viewed in FIG. 2, over respective wheels 22, 24. Wheels 22, 24 have projections 22a, 24a that engage the perforations or other spaces within belt 20. A suitable drive assembly 26, which may comprise a conventional motor and gear drive, is connected to wheels 22 by a drive shaft 26a for driving perforated conveyor belt 20 in a clockwise direction, as viewed in FIG. 2. Wheels 24 act as idler wheels to guide the opposite end of conveyor 20. As further shown in FIG. 2, perforated conveyor belt 20 includes a conveying surface 28 receiving a plurality of pouches 30 containing food product, such as liquid-based fruit or vegetable product. Pouches 30 ride along conveying surface 28 while being partially submerged within a pool 32 of heat transfer liquid. Liquid pool 32 may comprise either a heated liquid or a chilled liquid depending on whether a heating or a cooling operation is being performed by apparatus 10. Also, although apparatus 10 is particularly useful for effecting heat transfer to or from pouches 30, more rigid containers may also be processed with apparatus 10.

Figure 2:
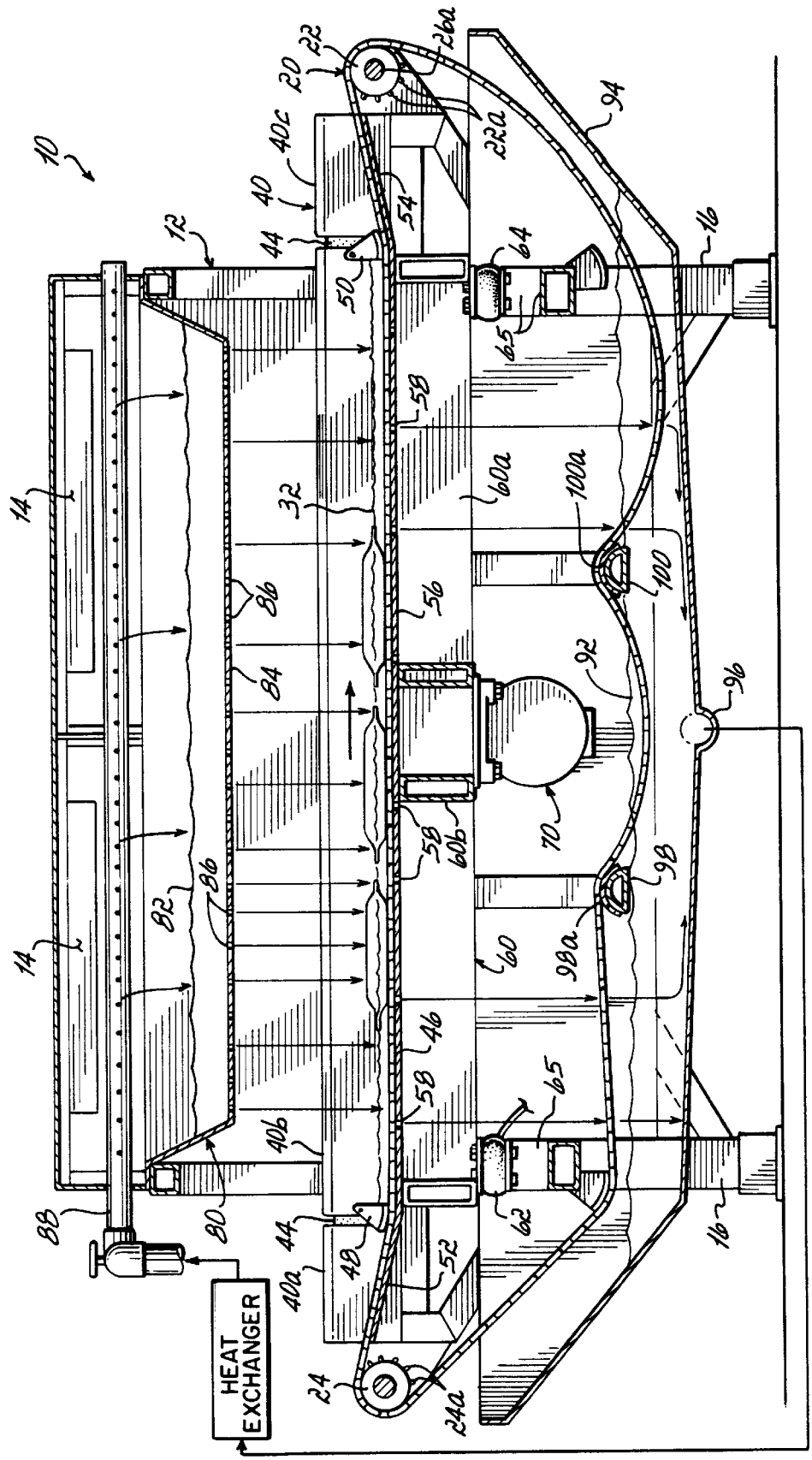
FIG. 2 is a cross sectional view taken generally along line 2—2 of FIG. 1.

Preferably, pouches 30 are only about half submerged in liquid pool 32, as shown in FIG. 2, to prevent pouches 30 from floating or losing substantial contact with conveying surface 28. To further promote engagement of pouches 30 with conveying surface 28, conveying surface 28 preferably includes a plurality of high friction elements 34, as best shown in FIG. 1. These may be replaced or augmented with additional engagement structure, such as upstanding members, for maintaining the movement of pouches 30 with conveyor belt 20.

Figure 3:
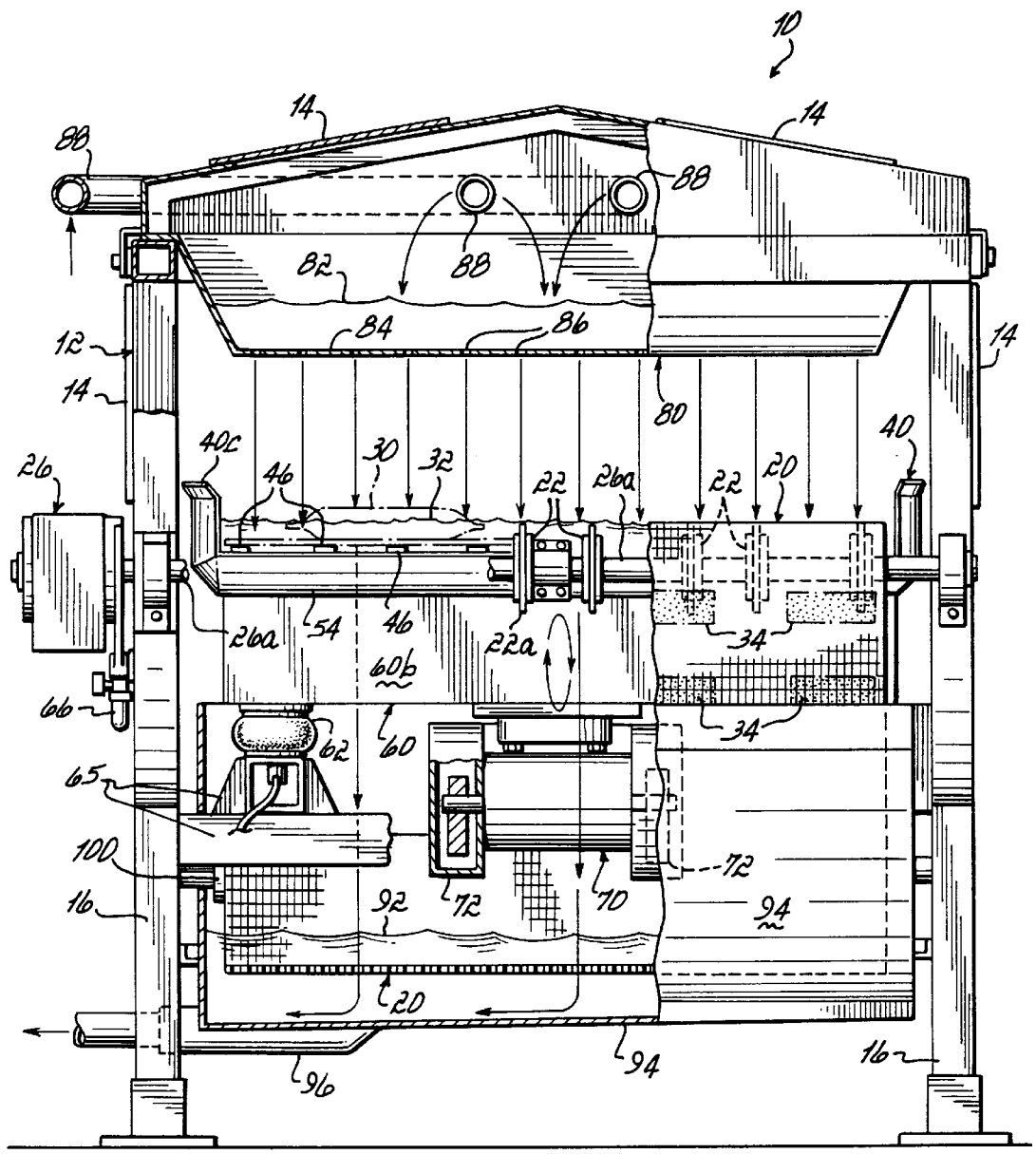
FIG. 3 is a partially fragmented end view of the apparatus shown in FIG. 1.
Figure 4:
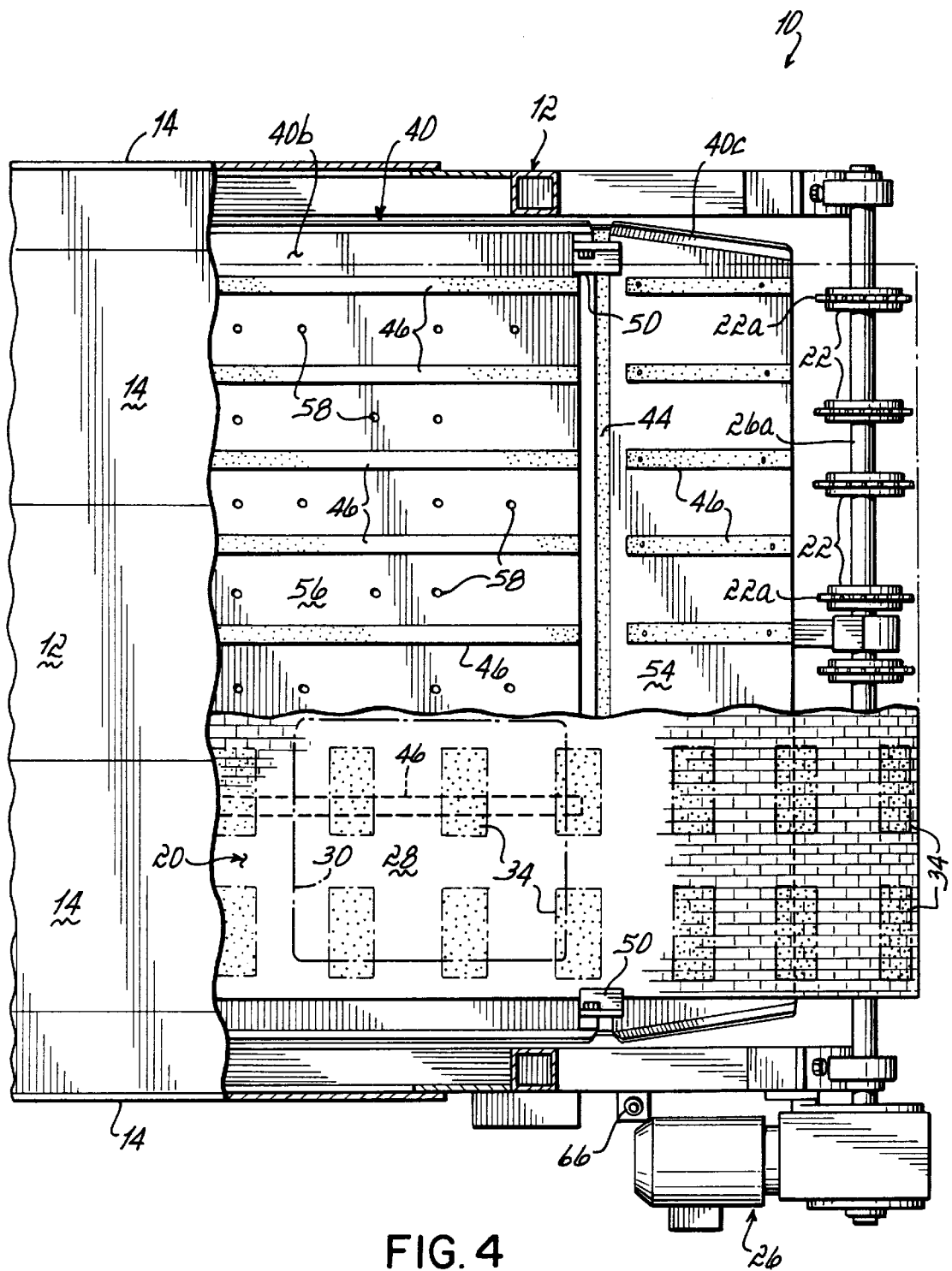
FIG. 4 is a partially fragmented top view of the apparatus shown in FIG. 1.

Perforated conveyor belt 20 is contained within and supported by a conveyor pan 40. In this preferred embodiment, conveyor pan 40 includes three sections, namely, an inlet section 40a, an intermediate section 40b, and an outlet section 40c. Inlet and outlet sections 40a, 40c are each sloped upwardly to contain the pool of liquid 32 within conveyor pan 40. Rubber connecting material 42, 44 may affix inlet and outlet sections 40a, 40c to respective ends of intermediate section 40b in a fluid-tight manner. One suitable rubber connecting material is available from Godiva Rubber Company, located in San Mateo, Calif. A plurality of skid bars 46, or other types of support members, are affixed to the lower, interior surface of conveyor pan 40 to allow perforated conveyor belt 20 to ride in contact with conveyor pan 40. Respective shoes 48, 50 hold conveyor belt 20 down against respective bottom walls 52, 54, 56 of conveyor sections 40a, 40b, 40c. More specifically, conveyor belt 20 is held against skid bars 46. Bottom wall 56 of intermediate conveyor pan section 40b includes a plurality of perforations 58 preferably spread across the entire width of conveyor belt 20 and extending along thee length of intermediate conveyor pan section 40b for uniformly draining conveyor pan 40 in a continuous manner. A conveyor support 60, which may be in the form of a frame structure having perpendicularly affixed frame members 60a, 60b, supports conveyor pan 40, and the liquid pool 32 and pouches 30 during operation. A plurality of pneumatic vibration dampeners 62, 64 (FIG. 2) are provided between conveyor support 60 and other support members 65 of housing structure 12. These isolate vibrations of conveyor pan 40 and support 60 from other portions of housing structure 12 and provide height adjustment to maintain conveyor pan 40 and support 60 at optimum operational height. Suitable pneumatic vibration dampeners may be obtained from Firestone, located in Carmel, Ind. Conventional pneumatic controls 66, which may include an air accumulator 68, are connected to operate pneumatic vibration dampeners 62, 64. At least one vibrator unit 70 is connected to the underside of conveyor support 60 and vibrates conveyor pan 40, perforated conveyor belt 20, the pool 32 of heat transfer liquid and pouches 30 during operation. A suitable vibrator unit may be obtained as Model BK 40-35/4 from Invicta, located in Charleston, S.C. As shown in FIG. 3, vibrator unit 70 may include eccentric, rotated weights 72 to produce vibrations which are ultimately transmitted to the pool 32 of liquid and to pouches 30.

A liquid distributor pan 80 is mounted above intermediate conveyor pan section 40b and holds a supply 82 of freshly chilled or heated liquid. Liquid distributor pan 80 also includes bottom surface 84 having perforations 86 and extending across substantially the entire length and width of the portion of conveyor belt 20 riding within conveyor pan section 40b. Pouches moving in this area therefore receive a shower of freshly chilled or heated liquid 82. Liquid distributor pan 80 is filled, preferably in a continuous manner, by one or more conduits 88. Conduits 88 receive liquid 82 from a heat exchanger 90 which may be a heater or a chiller. As shown in FIG. 2, heat exchanger 90 receives heat transfer liquid 92 from a lower liquid return pan 94 through a drain 96. Liquid return pan 94 is mounted to housing structure 12 and disposed directly below conveyor pan 40 to receive the liquid which continuously drains from pool 32. This liquid drains continuously between the frame members 60a, 60b of conveyor pan support 60. As also shown in FIG. 2, perforated conveyor belt 20 loops back through liquid return pan 94 and is guided over frame members 98, 100, which may have rounded upper surfaces with low friction pads or surfaces 98a, 100a.

Figure 5:
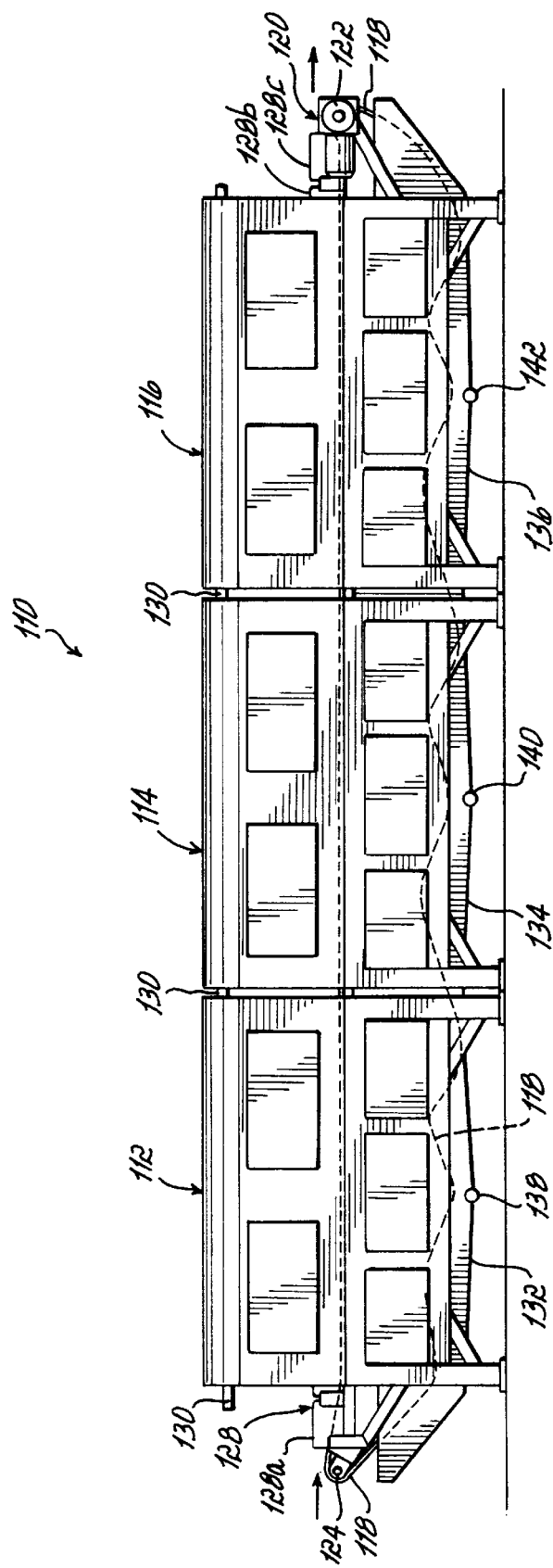
FIG. 5 is a side elevational view showing a longer heat exchange system linking together several heat transfer modules constructed according to the invention.

FIG. 5 illustrates a longer system 110 for heating or cooling product containers in essentially the same manner as apparatus 10 described with respect to FIGS. 1–4. System 110 may include multiple modules 112, 114, 116 that operate as described with respect to apparatus 10 above. In system 110, a single perforated conveyor belt 118 extends through each module 112, 114, 116 and is rotated by a single drive 120 connected with conveyor drive wheels 122. Like apparatus 10, idler wheels 124 are disposed at the opposite end of system 110. A conveyor pan 128 having inlet, intermediate, and outlet sections 128a, 128b, 128c extends through modules 112, 114, 116. One or more conduits 130 supply heat transfer liquid to the interior of modules 112, 114, 116 in the same manner as discussed above. These may supply the heat transfer liquid to liquid distributor pans (not shown) respectively mounted within modules 112, 114, 116. Each module 112, 114, 116 includes a liquid return pan 132, 134, 136, each having a drain 138, 140, 142. Drains 138, 140, 142 may be connected with one or more heat exchangers in a recirculation path leading back to supply conduits 130, as discussed with respect to FIGS. 1–4. It will be appreciated that system 110 may include more or less modules than the three shown in FIG. 5. The specific size of system 110 will depend, for example, on the heat transfer requirements, the quantity of given units over time, and size requirements of the individual product containers processed by system 110.

As one additional example of heat exchanging apparatus that may be constructed in accordance with the invention, one or more apparatus 10 and/or apparatus 110 may be combined in a heating and cooling operation. For example, one apparatus 10 or 110 may be used initially to heat and sterilize pouches 30 or other containers of product, while another apparatus 10 or 110 may be positioned at the outlet thereof to receive the pouches 30 or other containers for a subsequent cooling operation. In each stage of the process, apparatus 10 and 110 may be utilized in essentially the same manner as described above, with heated liquid being used in the sterilizing section and chilled liquid being used in the cooling section. If desired or necessary for some applications, apparatus constructed according to the invention may include additional heating or cooling elements. Also, apparatus of the invention may be used in conjunction with other heating or cooling apparatus depending on the applications.

The basic operation of apparatus 10, system 110, or a combined heating and cooling system, may be understood with reference to FIGS. 1 and 2. In this regard, product containers 30 are received on conveyor belt 20 at the left end or inlet end of housing 12. These product containers, which may be flexible pouches or bags 30, travel downwardly on conveyor 20 along bottom wall 52 of conveyor pan section 40a until they are partially submerged within a pool 32 of heat transfer liquid. Pouches 30 then travel horizontally through liquid pool 32 on conveyor belt 20 as it moves through intermediate section 40b of conveyor pan 40. Pool 32 of heat transfer liquid is supplied continuously by liquid showering into conveyor pan 40 from the supply 82 of liquid contained in liquid distributor pan 80. More particularly, this liquid continuously drains through perforations 86 contained in the bottom of distributor pan 84. This liquid supply 82 is continuously replenished from a heat exchanger 90 which may supply freshly chilled or heated liquid through conduits 88. The pool 32 of liquid contained in conveyor pan 40 is also continuously drained through perforations 58 contained throughout the bottom surface 56 of conveyor pan 40. This liquid drains into liquid return pan 94 and is eventually recirculated back to heat exchanger 90. While product containers 30 are conveyed along the bottom surface of conveyor pan 40, the vibrator unit 70 operates to continuously vibrate conveyor support 60, conveyor pan 40, the portion of conveyor 20 within conveyor pan 40, the pool 32 of heat transfer liquid and, finally, product containers 30 and the product contained therein. Product containers 30 then exit housing structure 12 at the outlet end or right end thereof, as viewed in FIGS. 1 and 2. Apparatus 10 thereby provides fast, thorough heat transfer between the heat transfer liquid and the contents of product containers 30 while moving containers on to further packaging operations.

As one example of the potential results of apparatus 10, prior conveying apparatus which simply included spraying the pouches of product with chilled water required 30 minutes of cooling treatment to reduce a 1½ gallon bag of ketchup from an input temperature of 190° F. to an output temperature of 100° F. using 33° F. water as the cooling liquid. The same apparatus takes 46–48 minutes to reduce the same item from 190° F. to 100° F. using 75° F.–85° F. water as the heat transfer liquid. In contrast, a system constructed in accordance with the invention takes 14 minutes for the same item to be reduced in temperature from 190° F. to 100° F. using 50° F. water as the heat transfer liquid and takes 20 minutes for the same temperature reduction using 77° F. water as the heat transfer liquid.

While the present invention has been illustrated by a description of a preferred embodiment and while this embodiment has been described in some detail, it is not the intention of the Applicant to restrict or in any way limit the scope of the appended claims to such detail. Additional advantages and modifications will readily appear to those skilled in the art. This has been a description of the present invention, along with the preferred methods of practicing the present invention as currently known. However, the invention itself should only be defined by the appended claims, wherein I claim:

1. Apparatus for transferring heat between a heat transfer liquid and a plurality of product containers, the apparatus comprising:

a perforated conveyor having a conveying surface for supporting and transferring the containers;

a conveyor pan receiving the conveying surface of the perforated conveyor and including an open top portion and at least one drain, the conveyor pan being adapted to hold a continuously recirculating pool of the heat transfer liquid at a level disposed above the conveying surface of the perforated conveyor;

a heat transfer liquid distributor spaced above the perforated conveyor and operative to shower the containers on the conveying surface with the heat transfer liquid by directing the heat transfer liquid through the open top portion of the conveyor pan; and a vibrator unit operatively connected with the conveyor pan and operating to vibrate the conveyor pan, the perforated conveyor, the pool of heat transfer liquid and the containers as the containers are moved by the perforated conveyor to thereby uniformly and efficiently transfer heat between the heat transfer liquid and the product in said containers.

2. The apparatus of claim 1 further comprising:
a conveyor support in contact with the perforated conveyor and mounted along a bottom surface of the perforated conveyor pan to transmit vibrations to the perforated conveyor.

3. The apparatus of claim 1 further comprising a liquid return pan mounted below the conveyor pan for receiving the heat transfer liquid from the drain.

4. The apparatus of claim 3, wherein the drain of said conveyor pan further comprises multiple perforations in a lower surface of the conveyor pan and generally occupying an area opposing the conveying surface such that the pool of heat transfer liquid drains generally in a uniform manner.

5. The apparatus of claim 3, wherein the perforated conveyor further comprises a continuous conveyor, and the continuous conveyor passes through the liquid return pan.

6. The apparatus of claim 1, wherein the perforated conveyor further includes a plurality of container engagement elements that maintain the containers moving along the perforated conveyor and through the pool of liquid.

7. The apparatus of claim 1, wherein the perforated conveyor is a continuous conveyor belt, and further including guide elements mounted in contact with the conveyor belt and directing the conveyor belt downwardly into the conveyor pan.

8. The apparatus of claim 1, wherein the liquid distributor is a liquid distributing pan adapted to hold a volume of the heat transfer liquid and having a lower, perforated surface generally occupying an area opposing the conveying surface such that the perforated surface can shower the conveying surface with the heat transfer liquid.

9. The apparatus of claim 1 further comprising:
a heat exchanger having an inlet connected for fluid communication with the drain of said conveyor pan and including an outlet connected for fluid communication with said liquid distributor such that a recirculation path is formed between the conveyor pan and the liquid distributor.

10. The apparatus of claim 9, wherein the heat exchanger is a device for cooling the heat transfer liquid.

11. The apparatus of claim 9, wherein the heat exchanger is a device for heating the heat transfer liquid.

12. The apparatus of claim 1, wherein the conveyor pan is disposed in a housing structure and further comprising a plurality of pneumatic vibration dampeners mounted between the housing structure and the conveyor pan to isolate vibrations of the conveyor pan from remaining portions of the housing structure.

13. The apparatus of claim 12 further comprising a conveyor pan support structure mounted between the pneumatic vibration dampeners and the conveyor pan.

14. The apparatus of claim 12, wherein the pneumatic vibration dampeners are height adjustable to change the height of said conveyor pan.

15. Apparatus for transferring heat between a heat transfer liquid and a plurality of product containers, the apparatus comprising:
a perforated conveyor having a conveying surface for supporting and transferring the containers;
a conveyor pan receiving the conveying surface of the perforated conveyor and including an open top portion and a perforated bottom wall, the conveyor pan being adapted to hold a continuously recirculating pool of the heat transfer liquid at a level disposed above the conveying surface of the perforated conveyor;
a heat transfer liquid distributor pan mounted above said perforated conveyor and having an interior and a perforated lower surface spaced above the perforated conveyor, said liquid distributor pan adapted to hold a supply of said heat transfer liquid in the interior and the perforated lower surface operating to shower the containers on the conveying surface with the heat transfer liquid by directing the heat transfer liquid through the open top portion of the conveyor pan;
a liquid supply conduit in fluid communication with the interior of the liquid distributor pan; and
a vibrator unit operatively connected with the conveyor pan for vibrating the conveyor pan, the perforated conveyor, the pool of heat transfer liquid and the containers as the containers are moved by the perforated conveyor to thereby uniformly and efficiently transfer heat between the heat transfer liquid and the product in said containers.

16. The apparatus of claim 15 further comprising:
a conveyor support in contact with the perforated conveyor and mounted along a bottom surface of the perforated conveyor pan to transmit vibrations to the perforated conveyor.

17. The apparatus of claim 15 further comprising a liquid return pan mounted below the conveyor pan for receiving the heat transfer liquid from the drain.

18. The apparatus of claim 17, wherein the drain of said conveyor pan further comprises multiple perforations in a lower surface of the conveyor pan and generally occupying an area opposing the conveying surface such that the pool of heat transfer liquid drains generally in a uniform manner.

19. The apparatus of claim 17, wherein the perforated conveyor further comprises a continuous conveyor, and the continuous conveyor passes through the liquid return pan.

20. The apparatus of claim 15, wherein the perforated conveyor further includes a plurality of high friction elements that maintain the containers moving along the perforated conveyor and through the pool of liquid.

21. The apparatus of claim 15, wherein the perforated conveyor is a continuous conveyor and further including guide elements mounted in contact with the conveyor and directing the conveyor downwardly into the conveyor pan.

22. The apparatus of claim 15, wherein the liquid distributor is a liquid distributing pan adapted to hold a volume of the heat transfer liquid and having a lower, perforated surface generally occupying an area opposing the conveying surface such that the perforated surface can shower the conveying surface with the heat transfer liquid.

23. The apparatus of claim 15 further comprising:
a heat exchanger having an inlet connected for fluid communication with the drain of said conveyor pan and including an outlet connected for fluid communication with said liquid distributor such that a recirculation path is formed between the conveyor pan and the liquid distributor.

24. The apparatus of claim 23, wherein the heat exchanger is a device for cooling the heat transfer liquid.

25. The apparatus of claim 23, wherein the heat exchanger is a device for heating the heat transfer liquid.

26. The apparatus of claim 15, wherein the conveyor pan is disposed in a housing structure and further comprising a plurality of pneumatic vibration dampeners mounted between the housing structure and the conveyor pan to isolate vibrations of the conveyor pan from remaining portions of the housing structure.

27. The apparatus of claim 26 further comprising a conveyor pan support structure mounted between the pneumatic vibration dampeners and the conveyor pan.

* * * * *